United States Patent [19]

Hegel

[11] Patent Number: 4,663,184
[45] Date of Patent: May 5, 1987

[54] RADIATION CURABLE PHOSPHORATE ESTER COMPOUNDS

[75] Inventor: Ramon F. Hegel, St. Paul, Minn.

[73] Assignee: Minnesota Mining and Manufacturing Company, St. Paul, Minn.

[21] Appl. No.: 790,070

[22] Filed: Oct. 22, 1985

[51] Int. Cl.$^4$ .............................................. B05D 3/06
[52] U.S. Cl. .................................... 427/44; 427/128; 568/14
[58] Field of Search ....................... 427/44, 54.1, 128; 568/14

[56] References Cited

U.S. PATENT DOCUMENTS

| | | | |
|---|---|---|---|
| 4,001,150 | 1/1977 | Juna et al. | 260/17 |
| 4,222,780 | 9/1980 | Shibatani et al. | 106/35 |
| 4,259,075 | 3/1981 | Yamauchi et al. | 433/217 |
| 4,368,043 | 1/1983 | Yamauchi et al. | 433/217 |
| 4,415,630 | 11/1983 | Kubota et al. | 427/44 |
| 4,420,537 | 12/1983 | Hayama et al. | 428/403 |
| 4,448,846 | 5/1984 | Chang et al. | 427/44 |
| 4,448,848 | 5/1984 | Okita et al. | 427/44 |
| 4,499,251 | 2/1985 | Omura et al. | 526/278 |
| 4,526,837 | 7/1985 | Ohtsuki et al. | 428/425.9 |
| 4,537,940 | 8/1985 | Omura et al. | 526/278 |
| 4,539,382 | 9/1985 | Omura et al. | 526/276 |
| 4,540,722 | 9/1985 | Bunker | 523/109 |

OTHER PUBLICATIONS

Data Sheets on Photomer 4171 and 4152 from Diamond Shamrock Chemicals Company.
Technical Data on Developmental Monomer XAS-10743.00 Isocyanatoethyl Methacrylate, C.A.S. No. 030674-80-7, Dow Chemical U.S.A., Midland, MI.
Corbridge, D. E. C., *Phosphorus*, Elsevier Scientific Publishing Company, N.Y., 1978, pp. 263-266.
Martens, J. A. et al., *Properties of Electron Beam Cured Magnetic Coatings*, presented at RADCURE '84, Atlanta, GA 9/13/84.

*Primary Examiner*—John H. Newsome
*Attorney, Agent, or Firm*—Donald M. Sell; James A. Smith; Douglas B. Little

[57] ABSTRACT

Radiation curable phosphorate ester compounds of the following formula:

$$(Rd)_n Y(OR)_m OP(OH)_2$$

wherein,
Rd is selected from the group consisting of $$H_2C=\underset{\underset{O}{\|}}{\overset{Ra}{C}}-O(RO)_m \text{ and } -CH_2=\underset{\underset{H}{R_f}}{\overset{O}{C}}-A-\overset{\|}{N}CO(RO)_m$$

wherein
n = 1–3, and those bond sites on Y not occupied by Rd are occupied by a moiety selected from the group consisting of —H and —ReOH wherein Re is a straight chain or branched alkyl having 1 to 20 carbon atoms;
Ra is selected from —H and —CH$_3$;
—Y— is a hydrocarbon moiety selected from the group consisting of straight chain, cyclic ad branched aliphatic, aromatic, and alicyclic moieties of 1–30 carbon atoms; and
R is an alkylene moiety having 2 to 5 carbon atoms;
R$_f$ is selected from the group consisting of hydrogen or methyl;
A is selected from the group consisting of $$-\overset{O}{\overset{\|}{C}}O(CH_2)_{n1}-, \quad -CH_2O\overset{O}{\overset{\|}{C}}NHR_g-, \text{ and}$$

$$-\overset{O}{\overset{\|}{C}}-O(CH_2)_{n1}O\overset{O}{\overset{\|}{C}}NHR_g-$$

in which n1 is an integer from 1 to 6; and R$_g$ is selected from the group consisting of alkylene moieties having 2 to 10 carbon atoms, 5- or 6-membered carbocyclic aliphatic radicals having 5 to 10 carbon atoms, and arylene radicals having 6 to 10 carbon atoms; and
m = 1–10.

These compounds are useful as dispersants in magnetic recording media, and yield media of improved stiffness.

10 Claims, No Drawings

RADIATION CURABLE PHOSPHORATE ESTER COMPOUNDS

FIELD OF THE INVENTION

This invention relates to radiation curable phosphorate ester compounds, such as acrylates of phosphoric acid. Such phosphorate ester compounds are useful in dispersing metal oxides, such as the magnetic iron oxides in pigment/binder magnetic recording media.

BACKGROUND

Pigment/binder recording media, such as recording tapes, normally comprise a substrate or backing coated with a magnetizable layer containing a magnetizable pigment such as cobalt adsorbed iron oxide powder. The rest of the magnetic layer comprises a binder resin system, containing curable polymeric resins such as polyurethane and vinyl cloride/vinyl acetate/vinyl alcohol copolymer (e.g., VAGH), dispersant to help disperse the pigment uniformly within the binder, and other ingredients such as lubricant and possibly head cleaning agent (e.g., alumina powder).

Among the critical performance characteristics to be controlled in recording tapes is tape stiffness. If a tape has insufficient stiffness, it may deform or cup as it is unwound and rewound. Such deformation causes the tape not to have good flat contact with the recording and read heads or transducers of a recording or reproducing apparatus. Stiffness can be obtained by using a stiff, relatively thick substrate or backing, but as greater volumes of a recording tape are taken up by the substrate, less total tape length can be included in cassettes or cartridges, thus allowing for less total recording time. Therefore, there is a desire to reduce tape backing thickness in order to allow for greater lengths of recording tape to be included in standard cassettes. One problem which accompanies this reduction in backing thickness is that of maintaining sufficient stiffness for good recording and reproducing properties.

Electron beam curing of binder polymers for recording media magnetic layers represents a major potential advance in the state of the art of manufacturing technology for the industry. However, using conventional hydroxy-functional dispersants in electron beam cured magnetic coatings has been found to reduce stiffness of recording media. The dispersant or wetting agent for the pigment can comprise as much as 25 to 30 weight percent of the binder, and a conventional hydroxy-functional dispersant in a urethane binder system has been found to function as a plasticizer in the cured coating.

DISCLOSURE OF INVENTION

A means has now been found to obtain acceptable stiffness in recording tapes having very thin substrates made of polyester by using electron beam curing technology in combination with new dispersants for pigment/binder media. The coatings used for the inventive magnetizable layers comprise ingredients that are reactive under exposure to ionizing radiation in order to achieve maximum physical properties. Many of the inventive dispersants are acrylate functional and help to provide total cure systems wherein the stiffness which formerly was provided by using relatively thick substrates can be provided by the cured binder system itself.

The new dispersant (which may also be referred to as a wetting agent or surfactant) is a phosphorate compound of the following generic formula:

wherein,

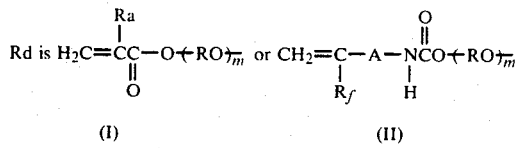

n=1-3, and those bond sites on Y not occupied by Rd are occupied by —H or —ReOH wherein Re is a straight chain or branched alkyl (1-30C);
Ra is —H or —CH₃;
—Y— is a straight chain, cyclic or branched aliphatic, aromatic or alicyclic hydrocarbon moiety of 1-30C;
R is an alkylene moiety having 2 to 5 carbon atoms;
R_f is hydrogen or methyl;
A is a divalent radical selected from the group including

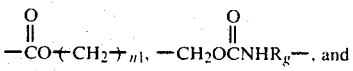

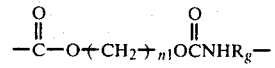

in which n1 is an integer from 1 to 6 and $R_g$ is a divalent radical from a diisocyanate $R_g(NCO)_2$ in which $R_g$ is alkylene having 2 to 10 carbon atoms, 5- or 6-membered carbocyclic aliphatic radical having 5 to 10 carbon atoms or an arylene radical having 6 to 10 carbon atoms; and
m=1-10, preferably 1-5.

Included within the scope of this invention are recording media containing the above described phosphorate ester and/or isocyanate compounds as a dispersant either in the magnetizable layer of a pigment/binder recording medium (typically at a level of 1 to 10 weight percent of the magnetizable particle solids) or in a backside coating.

DETAILED DESCRIPTION

The acrylates of the above formula may be made from commercially available propoxylated, partially acrylated polyols without solvent at temperatures up to about 90° to 95° C. using polyphosphoric acid. Although polyphosphoric acid is preferred, other phosphorylating agents, such as phosphorus oxychloride (POCl₃), can be used. If POCl₃ is used, reaction temperature should be somewhat lower (room temperature or below), and HCl by-product may result making it advisable to, water wash the final product. It is also necessary to hydrolyze the final product to obtain a phosphate ester according to the above generic formula (having two hydroxy groups on the phosphorus).

Phosphorylation of organic chemicals having an hydroxy group is well known in chemistry, see Corbridge, D. E. C., *Phosphorus*, Elsevier Scientific Publishing Co., N.Y., 1978, pp. 263-266. Another phosphorylating agent mentioned in Corbridge is phosphorus pentoxide $P_2O_5$.

The following reactions may been used to prepare an exemplary compound of this invention.

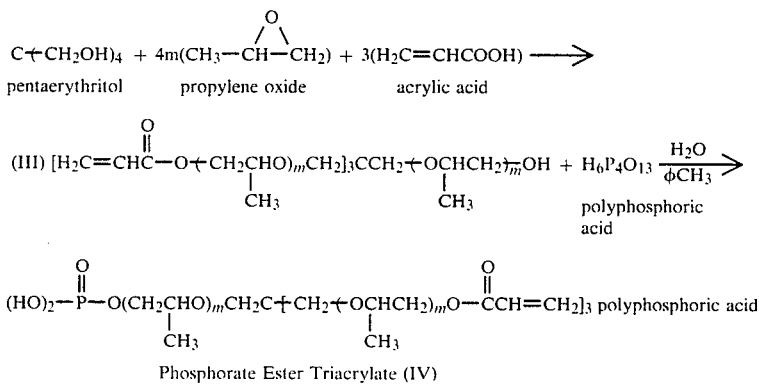

Phosphorate Ester Triacrylate (IV)

Methacrylic acid can be used instead of acrylic acid.

The procedure for carrying out the last step of the above reaction sequence is explained in Example I below, which (along with the other examples) is intended to be purely exemplary.

EXAMPLE I

The following raw materials have been used to prepare a phosphorate ester triacrylate of this example:

| | |
|---|---|
| propoxylated partially acrylated polyol obtained as Photomer 4171 from Diamond Shamrock Chemical Company | 7.000 Kg |
| phenolic antioxidant (obtained as Irganox 1010 from Ciba-Geiby Corp.) | 8.1 g |
| polyphosphoric acid | 1.785 Kg |

The polyphosphoric acid (ppa) was poured from a beaker into a clean, dry 12.4 l round bottom flask containing the propoxylated partially acrylated polyol and the antioxidant over a 70 minute period during which the batch temperature was controlled at about 70°–90° C. A small amount of insolubles appeared to be present during ppa addition but disappeared toward the end of the reaction. After the polyphosphoric acid had been completely added, the reaction flask was heated to 95° C. and maintained at that temperature for 3 hours. The reaction was continued at 93° C. and maintained at that temperature for 3–4 hours with agitation.

The batch was cooled to about 80° C., and 1.5 liters of deionized water were added after which about 3 l of toluene were added. The batch was mixed for one hour and was allowed to settle. The water phase (about 1.1 l) was decanted from the flask. One liter of water was added to the batch for a second water wash, after which, the agitation was stopped, the batch was allowed to settle and about 1.1 l of water was decanted off.

At this point, the batch was heated to 80° C., with dry air flow through flask to remove water by distilling off the water/toluene azeotrope. The distillation was stopped, and the batch was allowed to settle over night, after which an additional 300 ml of water was decanted off. The azeotropic distillation was begun again, resulting in the removal of 550 ml more water with the batch temperature at 95°–112° C. The batch was cooled down to near room temperature. The finished batch was clear, and 9,830 g were obtained 77.4% solids. The product was analyzed and found to be the phosphorate ester acrylate of formula IV and had 3.96% phosphorus.

It is preferred that the phosphorate ester triacrylate product have the maximum acrylic functionality. Also preferred is a molecular weight in the range of about 800–1200 obtained by adjusting the amount of propylene oxide used to make the propoxylated partially acrylated polyol which in turn adjusts the chain length of the polyether portion of the molecule.

Other syntheses of the inventive phosphorate ester acrylates are taught in Examples II and III below.

EXAMPLE II

The following raw materials were used:

| | |
|---|---|
| Propoxylated partially acrylated polyol of Example I | 125 g |
| Toluene | 150 g |
| Triethylamine | 27.8 g |
| Phosphorus oxychloride | 42.1 g |

The $POCl_3$ was added drop-wise to a solution of the other raw materials, the reaction exotherm bringing temperature to 45° to 48° C. in 15 minutes. The reacting mixture was stirred for one to two hours and then filtered to remove triethylamine hydrochloride by-product. A total of 5 water wash steps were performed similar to those in Example I, and they are summarized as follows:

| g. water added | g. water phase decanted off | comment |
|---|---|---|
| 25 g | 29 g | clear yellow |
| 25 | 36 | |
| 25 | 36 | $H_2O$ + oil |
| 25 | 25–30 | settled overnight before decanting |
| 75 | 70 | settled 1 hr. |

Final drying of the organic, toluene phase was by azeotropic distillation. The resulting organic product was 314 grams, 37.4% solids.

EXAMPLE III

The following raw materials were used:

| | |
|---|---|
| Propoxylated partially acrylated polyol obtained as Photomer 4152 | 165 g |

| -continued | |
|---|---|
| from Diamond Shamrock Chemical Co. | |
| P₂O₅ | 39.0 |

The partially acrylated polyol was added to the P₂O₅ suspended in toluene with a dry air atmosphere in the reaction flask. The reaction mixture was heated during and after the addition to reflux at 110° C. for one hour after which it went from white to near colorless, translucent appearance, with some dissolved chunks. The reaction mixture was then cooled to 30° C., and 10 to 20 ml of water were added, producing an exotherm which raised the temperature of the mixture to 50° C. A resin precipitated. Methylethyl ketone (MEK) was added and the mixture was warmed. The precipitated resin dissolved into the MEK phase. The water phase was decanted off, and the MEK phase was stripped to obtain 17 g of an oil insoluble in toluene. The toluene phase remaining in the stripped product was decanted and stripped to obtain a clear, colorless product 265 g., 55.2% solids.

Another embodiment of the inventive phosphorate ester acrylates is the subclass of alkoxylated urethane phosphonate esters represented by the generic formula when the moiety Rd is the group designated II above.

This subclass may be made using as a raw material unsaturated organic compounds having the following formula:

Exemplary compounds of formula (IV) are: isocyanato-alkyl acrylates and methacrylates such as isocyanatomethyl acrylate, 2-isocyanatoethyl acrylate, 2-isocyanatoethyl methacrylate, 3-isocyanatopropyl acrylate, 3-isocyanatopropyl methacrylate, 6-isocyanatohexyl acrylate, olefinic isocyanate esters such as allyl isocyanate and methallyl isocyanate, and the adducts of one mole of an organic diisocyanate and one mole of an ethylenically unsaturated addition polymerizable compound having a single group reactive with the isocyanate group.

A specific example of such alkoxylated urethane phosphonate esters may be made by the following reaction sequence, in which the reaction product of pentaerythritol and propylene oxide (propoxylated pentaerythritol) is reacted with isocyanatoethylmethacrylate, which is further reacted with polyphosphoric acid.

Other polyols may be substituted for pentaerythritol, such as: trimethylol propane, trimethylol ethane, hexane 1,2,6-triol, glycerol, erythritol, dipentaerythritol, sucrose, and sorbitol.

Other epoxides may be used instead of propylene oxide, such as: ethylene oxide, butylene oxide, amylene oxide and tetramethylene oxide. Mixtures of more than one epoxide could be used in which case R in the generic formula may be more than one alkylene moiety, i.e. more than one type of R in the same ester molecule.

The inventive magnetic recording media can be made by conventional techniques for making pigment/binder media, using the new dispersant in the binder. A dispersion is made by milling the ingredients of the magnetizable layer (e.g., binder, gamma ferric oxide pigment, dispersant, solvent and lubricant and possibly carbon black) for a sufficient time to obtain a uniform dispersion. The milled dispersion is then applied in a coating process, such as gravure or knife coating, to a flexible backing (e.g., polyester film). After coating, the coated backing or substrate material undergoes orientation in a magnetic field to align the magnetizable particles, and after that step, the recording medium is dried.

Additional examples of magnetic oxide pigment powders which can be dispersed with the inventive composition are: cobalt adsorbed ferric oxide (Fe₂O₃), Fe₃O₄, cobalt adsorbed Fe₃O₄, and CrO₂. Although the present discussion deals mainly with magnetic pigment dispersions, nonmagnetic oxides, such as alumina, titanium dioxide and zinc oxide, and carbon black can also be dispersed with the new phosphorate ester compounds.

The inventive dispersant may be added to a pigment dispersion dissolved in toluene solvent. A typical concentration of the magnetizable pigment is 80 weight percent of the nonvolatile materials (i.e., materials which remain in the final dried magnetizable layer). A typical thickness for the polyester film substrate is 14 micrometers, and a typical dry film thickness for the magnetizable layer is 1-5 micrometers. The dried magnetizable layer may be further calendered under pressure. After the drying step and possible calendering, the recording medium is irradiated with an electron beam (e-beam) under inert atmosphere (nitrogen, less than 300 ppm O₂) at a dosage of about 10 megarads (Mrads).

Electron beam dosage may range from about 1 to 20 Mrad, and the proper accelerating voltage is dependent on the thickness of the magnetizable layer. Normally 150 to 180 Kev is sufficient, but for magnetizable layers more than 6 micrometer thick, it should be at least 200 Kev (Kilo electron volts). A suitable electron beam

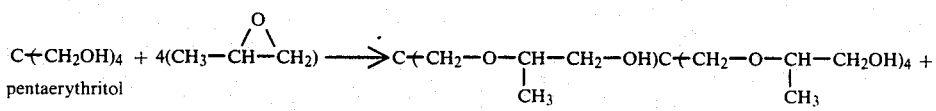

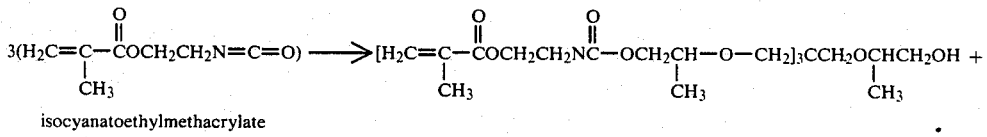

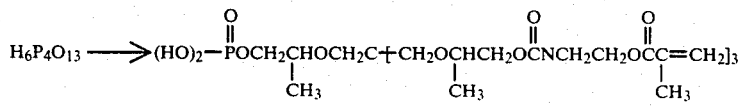

apparatus is the Electrocurtain apparatus made by Energy Sciences, Inc. of Woburn, Mass.

In using the inventive dispersants, a toluene solution of the phosphonate ester compound is mixed with the other solvents and the magnetizable pigment, the amount of phosphorate ester compound being 1-10 weight percent of the magnetizable pigment weight. To this mixture, the binder resin and head cleaning agent ($Al_2O_3$) are added, and the dispersion is milled to the desired smoothness. Lubricant is added, and the total dispersion is then coated onto the substrate, calendered and exposed to electron beam radiation.

EXAMPLE IV

A dispersion was made by milling the following ingredients:

TABLE 1

|  | % solids | grams liquid | grams solid | Total grams |
|---|---|---|---|---|
| Methylethyl ketone |  | 125 |  | 125 |
| Methylisobutyl ketone |  | 54 |  | 54 |
| Phosphorate ester acrylate (IV) | 72 | 3.11 | 8 | 11.11 |
| Acicular iron oxide particles (obtained as Pfizer 2566 from Pfizer Chemical Co.) |  |  | 194 | 194 |
| e-beam curable binder resin (obtained as Desolite 71 from Desoto, Inc.) | 52 | 52.0 | 56.3 | 108.3 |
| $Al_2O_3$ powder |  |  | 6 | 6 |
| Total |  | 234 | 264 | 499 |

The procedure described above was used to make a magnetizable coating on polyester film using the above ingredients. They were first mixed together by agitating in a vessel for one hour, and then they were milled to smoothness which was detected by microscopic examination. The dispersion was then coated onto biaxially oriented polyester film. The magnetic layer was then oriented to align the oxides particles, after which the recording medium or tape was dried and exposed to electron beam irradiation (8 Mrad).

A control sample was made by the same method and with the same ingredients, except that a commercially available dispersant was substituted for the inventive phosphonate ester acrylate. That commercially available dispersant was a phosphoric acid ester surfactant obtained as Gafac RE-610 from GAF Corporation. Eight grams of this solid surfactant control were used.

The inventive recording medium and the control were tested for stiffness in the machine direction (MD, i.e. direction in which the oxide particles were aligned) using ASTM test D822. The results of such testing on an Instron machine are given in Table 2 below:

TABLE 2

| Sample | Stiffness* (MPSI - thousands of pounds per square inch) MD |
|---|---|
| Tape made with Phosphorate Ester Acrylate | 1699 |
| Control | 1116 |

*average of three tests.

In the machine direction, the inventive recording medium showed a 52% increase in stiffness over the control.

The result of using the inventive dispersants is the ability to obtain recording tape of good stiffness with very thin substrates, because the magnetizable coating, and possibly the backside coating, which contain the new dispersants contribute to the stiffness which was formerly due to thicker substrates. This stiffening effect can be further enhanced by using the new dispersants in combination with coupling agents such as silane methacrylates, zirco aluminate methacrylate, and chromium complex methacrylate. It is preferred for the dispersion to contain both the inventive dispersant and a magnetizable pigment which has been pretreated with such a coupling agent.

Magnetic iron oxide dispersions containing the inventive phosphorate ester compounds are further improved by addition of lesser to equal amounts quaternary salts of alkoxylated alkylamino acrylates represented by the following formula:

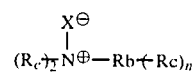

where
Re = aliphatic hydrocarbon residue of 1-6 carbon atoms
X = the remnant of an acetate, phosphate, or methylchloride

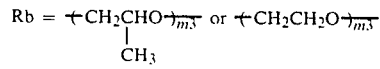

where m3 = 5 to 40; and

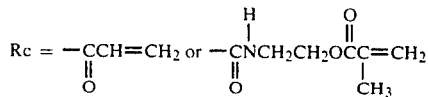

At a functionality in the polymerizable group of only one, these salts do not provide the physical property improvements that the multifunctional phosphorate esters provide. However, they do provide improved rheology in the dispersion and improved magnetic properties in the coating.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A phosphorate ester compound having the following generic formula:

wherein,
RD is selected from the group consisting of

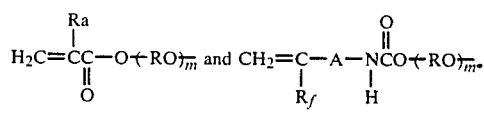

wherein
n = 1-3, and those bond sites on Y not occupied by Rd are occupied by a moiety selected from the group consisting of —H or —ReOH wherein Re is selected from straight chain or branched alkyl groups having 1-20 carbon atoms;

Ra is selected from —H or —CH$_3$;

—Y— is a hydrocarbon moiety having four bond sites selected from the group consisting of straight chain, or branched aliphatic moieties of 1-30 carbon atoms;

R is an alkylene moiety having 2 to 5 carbon atoms;

R$_f$ is selected from the group consisting of hydrogen or methyl;

A is selected from the group consisting of $$-\overset{O}{\overset{\|}{C}}O(CH_2)_{n1}-, \quad -CH_2O\overset{O}{\overset{\|}{C}}NHR_g-, \text{ and}$$

$$-\overset{O}{\overset{\|}{C}}-O(CH_2)_{n1}O\overset{O}{\overset{\|}{C}}NHR_g-$$

in which n1 is an integer from 1 to 6; and R$_g$ is selected from the group consisting of alkylene moieties having 2 to 10 carbon atoms, 5- or 6-membered carbocyclic aliphatic radicals having 5 to 10 carbon atoms, and arylene radicals having 6 to 10 carbon atoms; and m=1-10.

2. The phosphorate ester compound of claim 1 having the following formula:

$$(HO)_2-\overset{O}{\overset{\|}{P}}-O(CH_2CHO)_m CH_2C(CH_2)(OCHCH_2)_m O-\overset{O}{\overset{\|}{C}}CH=CH_2]_3.$$
$$\quad\quad\quad\quad\quad\quad\overset{|}{CH_3} \quad\quad\quad\quad\quad \overset{|}{CH_3}$$

3. A process for making the phosphorate ester compound of claim 1 which comprises the steps of:

A. reacting a polyol with at least one epoxide selected from the group consisting of propylene oxide, ethylene oxide, butylene oxide, amylene oxide, and tetramethylene oxide;

B. reacting the product from Step A with an acrylate containing compound selected from the group consisting of acrylic acid, methacrylic acid and compounds having the formula $$CH_2=\overset{|}{\underset{R_f}{C}}-A-NCO$$

to form a compound having at least one hydroxy group remaining on a part of the product molecule which is a remnant of the epoxide;

C. reacting the product from Step B with a phosphorylating agent.

4. The process of claim 3 wherein Step C is carried out by adding polyphosphoric acid to an agitated quantity of the product of Step B, which is held at an elevated temperature of 70° to 90° C., and which further comprises water washing the product of Step C and the removal of water by azeotropic distillation.

5. A magnetic recording medium containing the phosphorate ester compound of claim 1 which has been cured.

6. A method for making pigment/binder magnetic recording media which comprises the steps of:

(i) mixing an organic solution of a dispersant-effective amount of the phosphorate ester acrylate of claim 1 with solvents, magnetizable pigment powder and with binder resin;

(ii) milling the mixture from Step (i) to form a dispersion and continuing milling until the dispersion yields a coating of sufficient smoothness to function as a recording medium coating;

(iii) coating the dispersion from Step (ii) onto a substrate;

(iv) drying the coated substrate from Step (iii); and (v) exposing the dried product from Step (iv) to electron beam radiation sufficient to cure the phosphonate ester compound.

7. The method of claim 6 wherein the magnetizable pigment has been pretreated with a coupling agent.

8. The process of claim 6 wherein the mixture made in Step (i) further includes at least one quaternary salt of an alkoxylated alkylamino acrylate.

9. The magnetic recording medium produced by the process of claim 6.

10. The magnetic recording medium as recited in claim 5 wherein n=2-3.

* * * * *

UNITED STATES PATENT AND TRADEMARK OFFICE
CERTIFICATE OF CORRECTION

PATENT NO. : 4,663,184

DATED : May 5, 1987

INVENTOR(S) : Ramon F. Hegel

Page 1 of 2

It is certified that error appears in the above-identified patent and that said Letters Patent is hereby corrected as shown below:

In line 16 of the Abstract, "ad" between "cyclic" and "branched" should be --and--

In Column 1, line 20, "cloride" should be --chloride--

In Column 3, line 3, "been" should be --be--

In Column 3, line 35, "Geiby" should be --Geigy--

In Column 3, line 68, "obtained 77.4%" should be --obtained at 77.4%--

In Column 5, line 25, "phosphonate" should be --phosphorate--

In Column 5, line 31, "(IV)" should be --(V)--

In Column 5, line 35, "(IV)" should be --(V)--

In Column 5, line 47, "phosphonate" should be --phosphorate--

In Column 7, line 4, "phosphonate" should be --phosphorate--

Column 7, line 44, "phosphonate" should be --phosphorate--

UNITED STATES PATENT AND TRADEMARK OFFICE
CERTIFICATE OF CORRECTION

PATENT NO.   : 4,663,184
DATED        : May 5, 1987
INVENTOR(S)  : Ramon F. Hegel It is certified that error appears in the above-identified patent and that said Letters Patent is hereby corrected as shown below:

In Column 7, line 51, "D822" should be --D882--

In Column 8, line 59, "RD" should be --Rd--

In Column 10, line 41, "nate" should be --rate--

Signed and Sealed this

Twenty-ninth Day of March, 1988

Attest:

DONALD J. QUIGG

Attesting Officer   Commissioner of Patents and Trademarks